United States Patent [19]

Peters et al.

[11] 4,294,109

[45] Oct. 13, 1981

[54] TEST APPARATUS FOR HYDRAULIC VALVE

[75] Inventors: Lester L. Peters; John W. Black, both of Columbus, Ind.

[73] Assignee: Cummins Engine Company, Inc., Columbus, Ind.

[21] Appl. No.: 105,290

[22] Filed: Dec. 19, 1979

[51] Int. Cl.³ .................... G01M 15/00; G01M 19/00
[52] U.S. Cl. ................................. 73/119 A; 73/168
[58] Field of Search .................... 73/4, 119 A, 168

[56] References Cited

U.S. PATENT DOCUMENTS 3,554,223  1/1971  Shea .................................. 73/4 X Primary Examiner—James J. Gill Attorney, Agent, or Firm—Merriam, Marshall & Bicknell

[57] ABSTRACT

This disclosure relates to apparatus for testing a hydraulic assembly. The assembly includes a member having an orifice formed through a wall thereof and a valve member spring urged toward one side of the wall so as to close the orifice. The apparatus includes an enclosure for the assembly and hydraulic pressure means for applying hydraulic pressure to the opposite side of the wall around the orifice. The pressure applying means includes means for gradually changing the hydraulic pressure and indicating the pressure at which the valve member moves to open the orifice. The apparatus further includes means for supporting the assembly on a link so as to simulate actual operating conditions.

7 Claims, 3 Drawing Figures

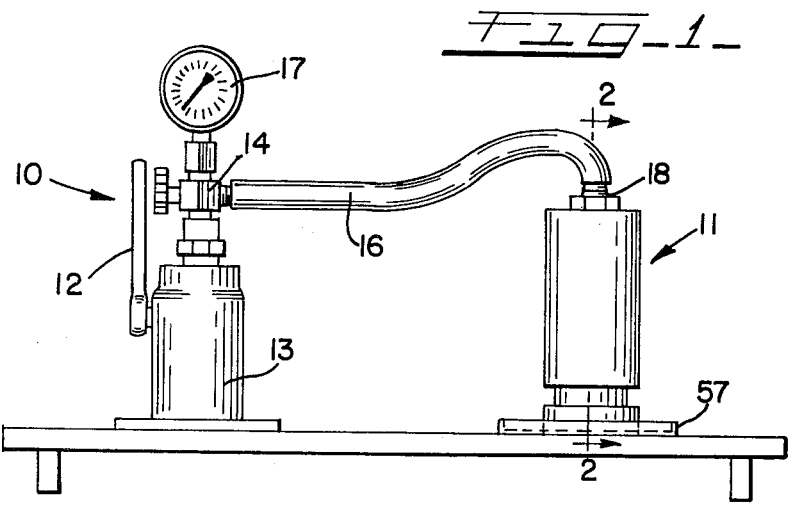
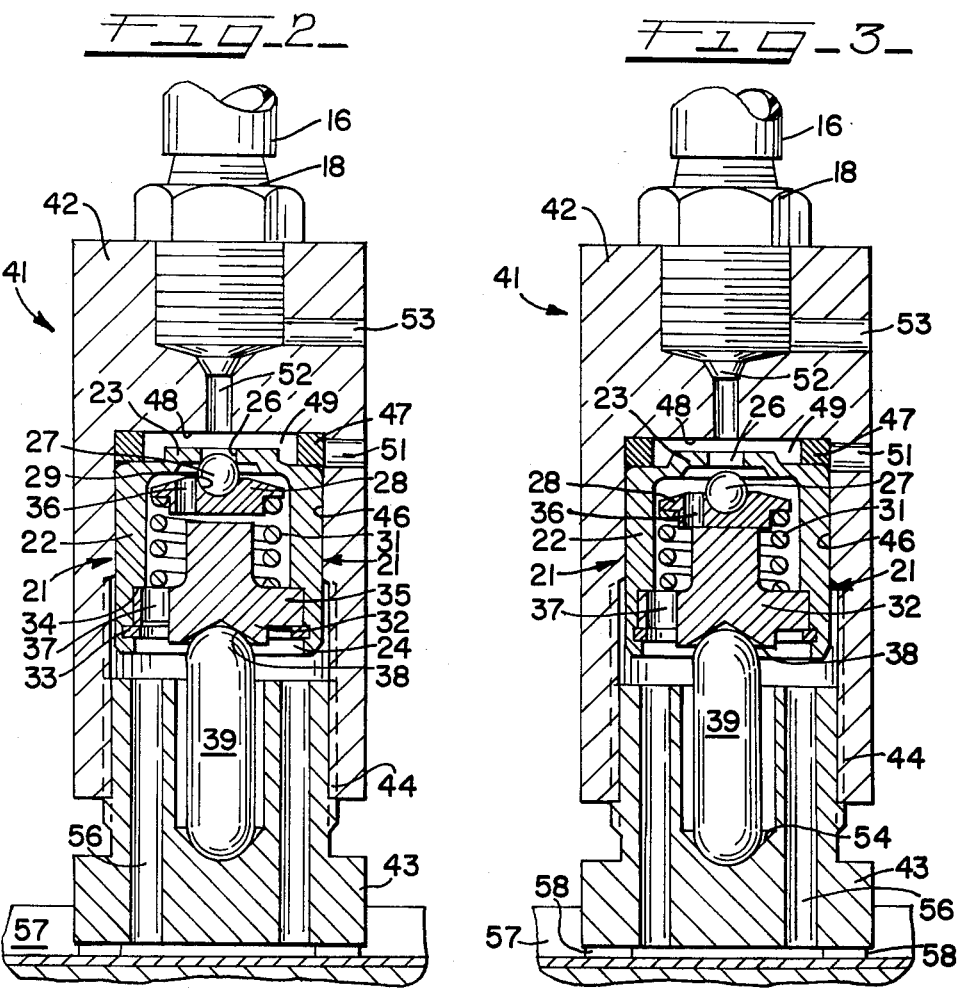

TEST APPARATUS FOR HYDRAULIC VALVE

A hydraulic assembly has been developed for use in the fuel injection system of an internal combustion engine, for varying the timing of injection of fuel. The injection system includes an injector for each engine cylinder, an injector drive train for operating each injector, and the hydraulic assembly for varying the time of initiation of injection. The assembly is connected in the drive train and a control fluid under pressure is applied to it. The fluid pressure may be adjusted and the assembly operates to vary the timing in response to the pressure. The assembly also includes a pressure responsive valve which opens at a preselected pressure.

It is of course necessary for proper engine operation to have the hydraulic assemblies operate properly and for the opening pressure to be essentially the same for all of the assemblies of an engine. It is also desirable to have test apparatus that may be used with equipment normally found in engine servicing facilities, and which will closely simulate actual engine operating conditions.

It is a general object of this invention to provide apparatus which will serve the foregoing needs.

Apparatus in accordance with the present invention comprises a housing for receiving a hydraulic variable timing assembly, the assembly including a part having an orifice formed in a wall thereof and a valve member on one side of the wall and spring urged toward the wall to close the orifice. The housing forms a sealed chamber on the opposite side of the wall around the orifice, and the chamber is connected to receive a fluid under pressure from a variable fluid pressure supply. The apparatus further includes a link for supporting the assembly in a manner that simulates actual operating conditions.

The following U.S. patents may be considered pertinent to this disclosure:

| Patentee | Number |
| --- | --- |
| Graham | 2,263,801 |
| Voorhies | 2,334,970 |
| Kelly | 2,619,834 |
| Burrell | 2,635,464 |
| Delehanty | 2,690,670 |
| Albaugh | 2,838,931 |
| Simmons | 2,910,864 |

The foregoing and other objects and advantages of the present invention will be better understood from the following detailed description taken in conjunction with the accompanying figures of the drawing, wherein:

FIG. 1 shows test apparatus in accordance with the invention; and

FIGS. 2 and 3 are similar sectional views of a part of the apparatus, showing two different operating conditions.

With reference first to FIG. 1, the apparatus includes a source of hydraulic fluid under pressure, which in the specific example disclosed herein comprises a pump 10, and a test fixture or housing 11. The pump 10 is preferably a type that is commonly available and found in most engine servicing facilities. For example, a pump such as the Bosch test pump EFEP 60 H may be used. Such a pump is primarily used for testing fuel injectors for diesel engines, and includes a handle 12 mounted on the side of a pump cylinder 13. The pump outlet 14 is connected to a high pressure hose 16 and a pressure gauge 17 shows the outlet pressure. Repeatedly turning the handle 12 increases the pressure in the hose to the desired level. The hose 16 has a fitting 18 secured to it, which is attached to the fixture 11.

With reference to FIGS. 2 and 3, the apparatus being tested comprises an assembly 21 that is mounted within the fixture 11. The assembly 21 comprises an inverted cup-shaped piston 22 having a wall 23 across the upper side and an opening 24 at the bottom side. An orifice 26 is formed at substantially the center of the wall 23 and a ball shaped valve member 27 is mounted adjacent the lower side of the wall 23 and the orifice 26. A valve support or disc 28 receives the member 27 in a socket 29 formed in its upper surface. A coiled compression spring 31 is positioned between the disc 28 and a spider or support 32 and urges the valve member 27 toward the orifice 26. The support 32 is positioned in the bottom side of the opening 24 and held in place by a ring 33. As shown in FIGS. 2 and 3, the opening 24 is counterbored to produce a shoulder 34 and the support 32 includes a flange 35 that fits between the shoulder 34 and the ring 33. Holes 36 and 37 are formed in the disc 28 and in the support 32 for flow of fluid. The support 32 has a socket 38 formed in its bottom wall, which receives the upper end of a support link 39.

When the assembly 21 is installed in the drive train of a cam driven fuel injector of a diesel engine, for example, the upper side of the wall 23 is located in a chamber that receives an operating fluid such as the engine lubricant. The support 32 is supported by a link of the drive train, which fits in the socket 38. The compression spring 31 urges the valve member 27 upwardly to the FIG. 2 position where the orifice 26 is closed. During operation of the engine, the piston 22 is moved in a cylinder during an injection stroke of the injector. At a point in the injection stroke, the pressure of the operating fluid changes from a relatively low value to a relatively high value. The fluid exerts a downward force on the valve member 27 but when the pressure is at the low value the force does not overcome the force of the spring 31 and the valve member 27 is held against and seals the orifice 26. When the fluid pressure is increased to the relatively high value, the fluid force overcomes the spring force and moves the valve member 27 off of the orifice 26. In a multicylinder engine, it is of course highly desirable for all of the assemblies 21 to operate to open the orifice 26 at essentially the same fluid pressure, and it is the function of the test apparatus disclosed herein to test the operation of such an assembly.

The test fixture 11 includes a housing 41 formed by an enclosure 42 and a base 43 which are threaded together as indicated at 44. The enclosure 42 has a bore 46 therein which receives the assembly 21, the outer surface of the piston 22 fitting snugly within the bore 46. A gasket 47 is positioned between the wall 23 and the adjacent wall 48 of the bore 46, a chamber 49 thus being formed on the upper side of the wall 23 around the orifice 26. The gasket 47 may be a brass or copper washer which is soft enough to deform and form a seal around the chamber 49. A weep hole 51 is preferably formed through the wall of the enclosure 42 adjacent the gasket 47 so that any leakage past the gasket 47 may be detected. A fluid passage 52 is formed through the enclosure 42 which receives the fitting 18, the passage 52 leading to the chamber 49. Another weep hole 53 is preferably formed through the wall of the enclosure 42 adjacent the fitting 18 so that any leakage may be detected past the connection of the fitting with the enclosure.

The assembly 21 is supported on the base 43 by the short link 39 which extends between the socket 38 of the support 32 and a socket 54 formed on the base 43. Holes 56 are formed through the base 43 for drainage of any fluid from the interior of the bore 46. The fixture 11 may be placed in a pan 57 which collects any fluid draining through the holes 56, and spacers 58 may be provided to keep the lower ends of the holes 56 open.

In a preferred method of testing an assembly 21, the enclosure 42 is detached by a technician from the base 43 and the assembly 21 is positioned on the upper end of the link 39. The enclosure 42, with a gasket 47 positioned in the bore 46, is then mounted over the assembly and the enclosure 42 is tightly threaded to the base 43 to produce a sealed connection at the gasket 47. Various expedients may be employed to remove air from the chamber 49, the passage 52 and the hose 16, as by prefilling these parts with the fluid of the pump 13. The fitting 18 is attached to the enclosure 42 and the technician then operates the handle 12 to pump up the fluid pressure. The gauge 17 indicates the highest fluid pressure reached in each crank of the handle 12. At a critical fluid pressure which is a function of the force of the spring 31 and the area of the orifice 26, the valve member 27 moves away from the orifice 26 and part of the fluid flows from the chamber 49 and through the orifice 26 and the holes 36, 34 and 56. The amount of downward movement of the valve member 27 is greatly exaggerated in FIG. 3 to illustrate the operation. The pressure in the chamber 49 does not rise above the critical pressure even though the handle 12 is cranked, and the technician determines the critical pressure by observing the highest pressure indicated by the gauge 17. The technician determines from the engine specifications the correct or desired critical pressure and compares the measured pressure with the desired pressure. The technician may also make a comparison of the critical pressures of the assemblies of a particular engine. From these comparisons the technician can determine whether the opening pressure meets the pressure specified for the given engine model. If not, perhaps the correct spring has not been installed, the valve 27 may not be seating properly, or the spring has failed, for example.

The foregoing described apparatus and method are highly advantageous. An assembly being tested is supported in the fixture by the link 39 which is similar to the support provided during actual operating conditions, and the test structure further simulates actual operating conditions. The test fixture is small and relatively inexpensive and it may be used with a readily available hand-operated pump.

We claim:

1. Apparatus for use in testing a hydraulic assembly, the assembly including a cup-shaped part having a bottom wall, a generally cylindrical wall, and an orifice formed in the bottom wall thereof, a valve member within said cylindrical wall on one side of the orifice, a spring urging the valve member toward the bottom wall to close the orifice, and a spider positioned within the cylindrical wall and supporting the spring, the spider further being connected to the part, said apparatus comprising a housing having a bore formed therein that is adapted to receive the assembly, said housing including seal means adapted to engage the outer surface of said assembly and form a sealed chamber on the outer side of the bottom wall around the orifice, means on said housing for connecting said chamber to receive a fluid under pressure from a variable fluid pressure supply, and link means connected to said housing and adapted to engage the spider for supporting the assembly against said pressure in a manner that simulates actual operating conditions, said cup-shaped part being supported against said pressure only by said connection with said spider.

2. Apparatus as in claim 1, wherein said housing comprises base means and enclosure means, means for tightly connecting said base and enclosure means, said enclosure means forming said bore therein that is adapted to receive the assembly, and said link means extending between said base means and the assembly.

3. Apparatus as in claim 2, wherein said base means has holes formed therethrough for draining said fluid.

4. Apparatus as in claim 1, wherein said seal means includes gasket means in said bore between said housing and the assembly for sealing said chamber, said housing having a weep hole formed therethrough for indicating leakage through said gasket.

5. Apparatus as in claim 1, wherein said housing has a passage formed therein leading to said chamber, said passage being adapted to receive said fluid under pressure.

6. Apparatus as in claim 5, and further including pump means connected to said passage for supplying said fluid under pressure pressure.

7. A method of testing an hydraulic assembly including a part having an orifice formed in a wall thereof, a valve member adjacent the orifice and spring urged to close the orifice, and valve support means connected to the part and supporting the end of the spring remote from the valve member, comprising the steps of positioning the assembly in a housing that forms a sealed chamber on the outside of said part and around said orifice, supporting said assembly in said housing by a link pivotally connected between the housing and valve support means, connecting a hand-operated fluid pump to said chamber, operating said pump to increase the fluid pressure in said chamber, and noting the fluid pressure at which said orifice opens.

* * * * *